(12) United States Patent
Suzuki et al.

(10) Patent No.: US 12,510,121 B2
(45) Date of Patent: Dec. 30, 2025

(54) ROTATIONAL FORCE TRANSMISSION DEVICE

(71) Applicant: TOYOTA BOSHOKU KABUSHIKI KAISHA, Aichi (JP)

(72) Inventors: Kouju Suzuki, Aichi (JP); Tadasuke Higuchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 352 days.

(21) Appl. No.: 18/130,124

(22) Filed: Apr. 3, 2023

(65) Prior Publication Data
US 2023/0323919 A1    Oct. 12, 2023

(30) Foreign Application Priority Data
Apr. 8, 2022    (JP) .................... 2022-064518

(51) Int. Cl.
*F16D 3/06* (2006.01)
*B60N 2/06* (2006.01)
*F16D 1/10* (2006.01)

(52) U.S. Cl.
CPC ............ *F16D 3/06* (2013.01); *B60N 2/067* (2013.01); *F16D 2001/103* (2013.01)

(58) Field of Classification Search
CPC . B21B 35/142; B21B 35/143; B60N 2/02253; B60N 2/06; B60N 2/067; B60N 2/07; B60N 2/1635; B60N 2/164; B60N 2/165; B60N 2/166; B60N 2/185; B60N 2/1853; B60N 2/1864; B60N 2/1871; F16D 3/06; F16D 3/16; F16D 3/18; F16D 3/185; F16D 2001/103; Y10T 403/32032;
(Continued)

(56) References Cited

U.S. PATENT DOCUMENTS 2,456,182 A * 12/1948 Goble .................... F21V 21/29
                                                      403/56
2,924,954 A *  2/1960 Panhard .................. F16D 3/185
                                                      464/154
(Continued)

FOREIGN PATENT DOCUMENTS

FR        1267017 A  *  1/1961  ............ F16D 3/185
JP      S5582821 A      6/1980
(Continued)

OTHER PUBLICATIONS

Office Action issued in counterpart Japanese Patent Application No. 2022-064518, dated Aug. 19, 2025, and translation thereof.
(Continued)

Primary Examiner — Josh Skroupa
(74) Attorney, Agent, or Firm — Greenblum & Bernstein, P.L.C.

(57) ABSTRACT

A rotational force transmission device configured to transmit a rotational force and applied to a vehicle seat apparatus. The rotational force transmission device includes an input-side transmission member having a ball point, an output-side transmission member slidably coupled to the input-side transmission member and having a ball point, and an elastic member providing an elastic force to make the input-side transmission member and the output-side transmission member displaced apart from each other along a central axis direction.

10 Claims, 6 Drawing Sheets

(58) Field of Classification Search
CPC ..... Y10T 403/32041; Y10T 403/32057; Y10T 403/32549; Y10T 403/7033
USPC ...... 464/157, 158, 159, 169; 403/56, 57, 59, 403/112, 359.5
See application file for complete search history.

(56) References Cited

U.S. PATENT DOCUMENTS

| | | | | |
|---|---|---|---|---|
| 3,825,356 | A * | 7/1974 | Crook, Jr. ............... | F16G 11/02 |
| | | | | 403/404 |
| 5,481,937 | A * | 1/1996 | Uphaus .................... | F16D 3/06 |
| | | | | 280/775 |
| 5,813,794 | A * | 9/1998 | Castellon .................. | F16D 3/06 |
| | | | | 403/359.5 |
| 11,325,637 | B2 * | 5/2022 | Kamitani .................. | F16D 3/06 |
| 2005/0119056 | A1 * | 6/2005 | Chien ..................... | F16D 3/185 |
| | | | | 464/158 |
| 2014/0187338 | A1 * | 7/2014 | Chen ........................ | F16D 3/18 |
| | | | | 464/158 |
| 2016/0265596 | A1 * | 9/2016 | Yu .......................... | F16D 3/185 |
| 2020/0338700 | A1 * | 10/2020 | Chen .................. | B25B 23/0014 |

FOREIGN PATENT DOCUMENTS

| | | |
|---|---|---|
| JP | H04175514 A | 6/1992 |
| JP | H05012256 U | 2/1993 |
| JP | H06-036947 U | 5/1994 |
| JP | 2019007602 A | 1/2019 |

OTHER PUBLICATIONS

Office Action issued in counterpart Chinese Patent Application No. 202310363935.5, dated Oct. 14, 2025, and translation thereof.

* cited by examiner

ROTATIONAL FORCE TRANSMISSION DEVICE

CROSS-REFERENCE TO RELATED APPLICATIONS

This application claims the benefit of Japanese Patent Application No. 2022-064518 filed on Apr. 8, 2022 with the Japan Patent Office, the entire disclosure of which is incorporated herein by reference.

BACKGROUND

The present disclosure relates to a rotational force transmission device to transmit a rotational force for use in a vehicle seat apparatus.

For example, Japanese Unexamined Utility Model Application Publication No. H6-36947 (Patent Document 1) discloses a rotational force transmission device in which an output shaft and a flexible wire are coupled to each other through a spring. This is intended to avoid occurrence of a coupling failure between the output shaft of an electric motor and the flexible wire due to dimensional variations of a fixing position.

SUMMARY

In the rotational force transmission device disclosed in Patent Document 1, a leading-end portion of the flexible wire is inserted into a recess and is fittingly locked. Thus, for example, if there are dimensional variations leading to crossing of an axial direction of the flexible wire and an axial direction of the output shaft, it is impossible to absorb the dimensional variations.

The present disclosure discloses one example of a rotational force transmission device in which, even if there are dimensional variations leading to crossing of an axial direction of a flexible wire and an axial direction of an output shaft, such dimensional variations can be absorbed.

It is desirable that a rotational force transmission device to transmit a rotational force for use in a vehicle seat apparatus comprises, for example, at least one of elements described below.

The elements are an input-side transmission member that comprises a ball point to which a rotational force is input; an output-side transmission member slidably coupled to the input-side transmission member along a central axis direction of the ball point, the output-side transmission member comprising a ball point to output a rotational force; and an elastic member providing an elastic force to make the input-side transmission member and the output-side transmission member displaced apart from each other along the central axis direction.

In the rotational force transmission device with this configuration, dimensional variations in an axial direction are absorbed by the elastic member, and dimensional variations leading to crossing of respective axial directions are absorbed by either of the ball points. Thus, according to the rotational force transmission device, even if there are dimensional variations leading to crossing of the respective axial directions, such dimensional variations can be absorbed.

The rotational force transmission device may be configured, for example, as described below.

The input-side transmission member and the output-side transmission member may preferably comprise respective splined portions and be slidably coupled to each other.

With this configuration, a rotational force may be surely transmitted from the input-side transmission member to the output-side transmission member by means of the splined portions.

Also, one of the input-side transmission member or the output-side transmission member may preferably comprise a locking portion that is locked to a locked portion provided to the other of the input-side transmission member or the output-side transmission member.

This configuration reduces separation between the input-side transmission member and the output-side transmission member due to an elastic force of the elastic member. Consequently, an improved assemblability of the rotational force transmission device can be achieved.

BRIEF DESCRIPTION OF THE DRAWINGS

An exemplary embodiment of the present disclosure will be described hereinafter with reference to the accompanying drawings, in which.

DETAILED DESCRIPTION OF EXEMPLARY EMBODIMENTS

An "embodiment" described hereinafter is merely one example of embodiments within the technical scope of the present disclosure. In other words, matters specifying the invention recited in the attached claims are not limited to any specific configuration, structure, or the like indicated in the embodiment below.

The present embodiment describes an example of a seat to be mounted in a vehicle, such as a car. Arrows, oblique lines, and the like indicating directions in the figures are illustrated to facilitate understanding of relationships among the figures, and of shapes of members and portions.

A vehicle seat apparatus of the present embodiment is not limited to the directions illustrated in the figures. The directions illustrated in the figures are directions in a state where the vehicle seat apparatus is assembled to a car. A figure with an oblique line does not always show a sectional view.

With respect to at least a member or a portion assigned a reference numeral and described, at least one member or portion is provided except where there is a limiting word, such as "one". In other words, if there is no limiting word, such as "one", two or more members may be provided. The vehicle seat apparatus comprises elements, such as at least members and portions assigned respective reference numerals and described, as well as structural portions shown in the figures.

1. Overview of Vehicle Seat Apparatus

Figure 1:
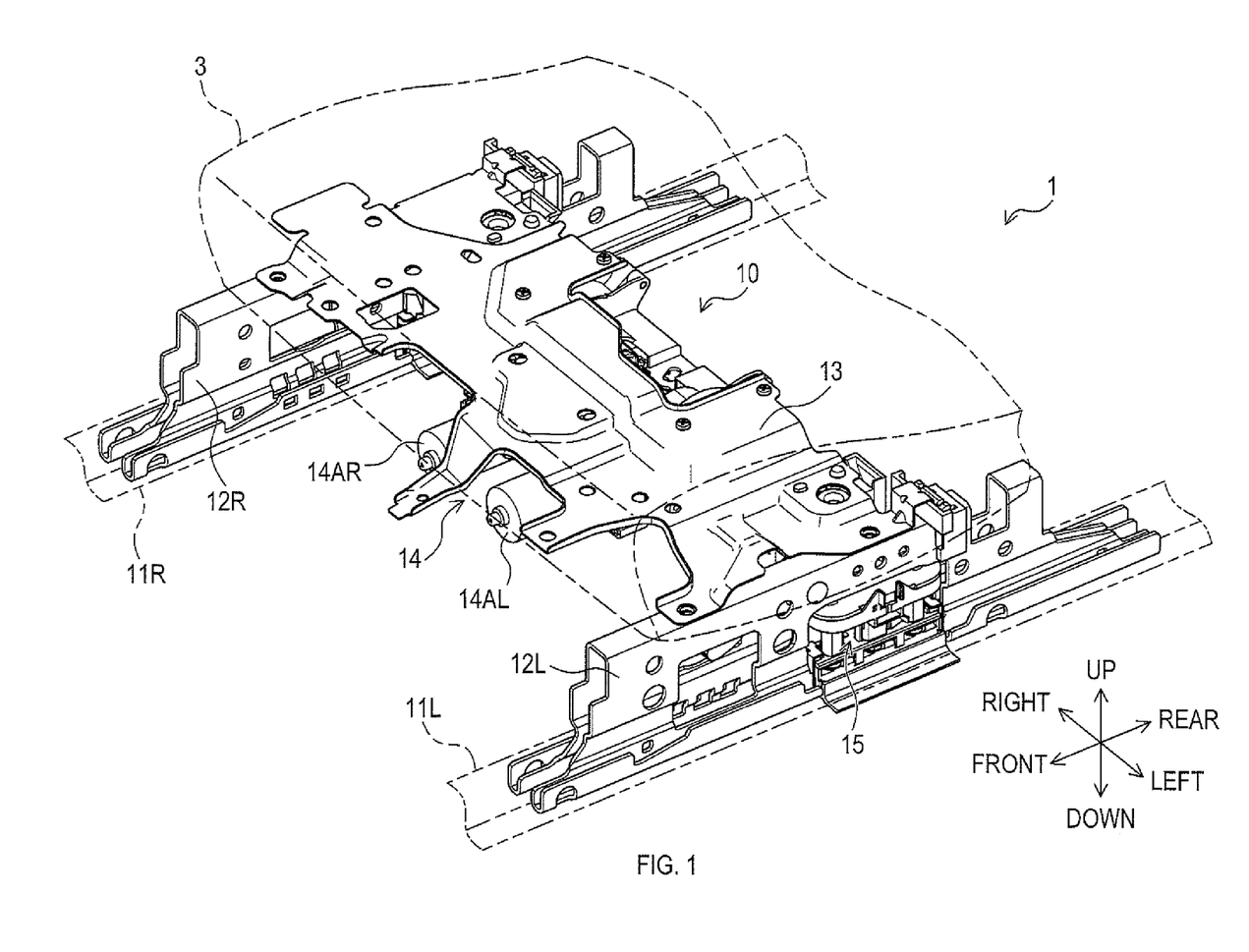
FIG. 1 is a view showing a vehicle seat apparatus of the present embodiment.

As shown in FIG. 1, a vehicle seat apparatus 1 comprises a vehicle seat 3 indicated by two-dot chain lines, and a sliding device 10 indicated by solid lines (partly including two-dot chain lines). The vehicle seat 3 is a seat on which an occupant is seated.

The sliding device 10 is a device to slidably support the vehicle seat 3. The sliding device 10 allows the vehicle seat 3 to slide along a seat front-rear direction. In the present embodiment, the seat front-rear direction coincides with a front-rear direction of the vehicle.

2. Configuration of Sliding Device 2.1 Overview of Sliding Device

Figure 2:
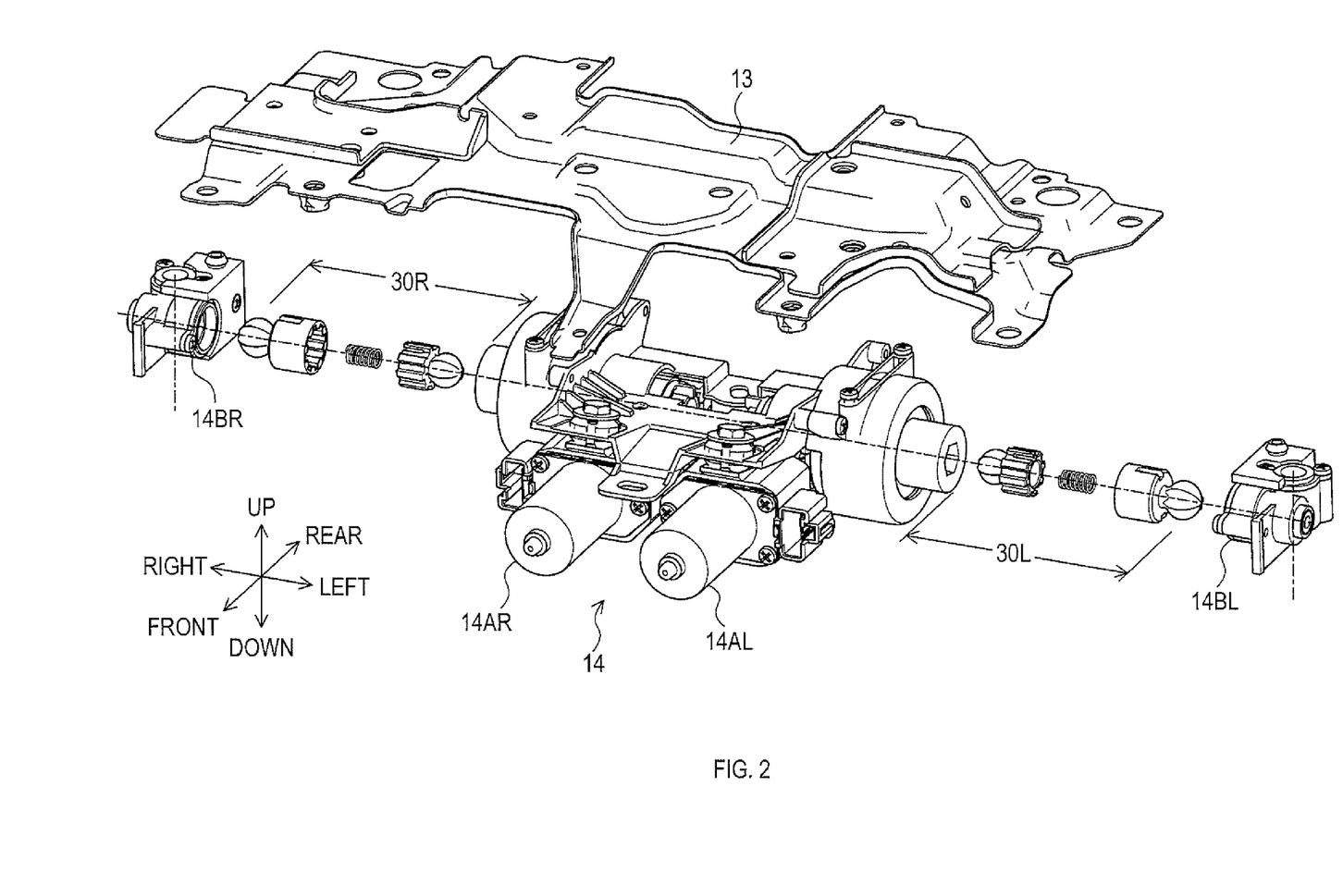
FIG. 2 is a view showing a motor unit, a rotational force transmission device, and other components.

As shown in FIG. 1, the sliding device 10 comprises fixed rails 11R, 11L; a same number of movable rails 12R, 12L as the fixed rails 11R, 11L; one regulator bracket 13, one motor unit 14, a same number of drive units 15 (however, only one is shown in FIG. 1) as the movable rails 12R, 12L; and rotational force transmission devices 30R, 30L (see FIG. 2).

The fixed rails 11R, 11L are tracks to be fixed to the vehicle in a mutually parallelly arranged state. The movable rails 12R, 12L are slidably mounted to the fixed rails 11R, 11L, respectively. The vehicle seat 3 is mounted on top of the movable rails 12R, 12L.

The motor unit 14 comprises at least one electric motor (two electric motors 14AR, 14AL in the present embodiment), and generates a driving force to displace the movable rails 12R, 12L. The motor unit 14 is fixed to the regulator bracket 13.

The regulator bracket 13 is a panel-shaped bracket fixed to the movable rails 12R, 12L so as to bridge between the movable rails 12R, 12L. The regulator bracket 13 is fixed to the movable rails 12R, 12L with fasteners (not shown), such as bolts, in a state of being arranged at respective upper ends of the movable rails 12R, 12L.

The drive units 15 are provided to the respective movable rails 12R, 12L. The drive units 15 each receive a driving force from the motor unit 14, and slide a corresponding one of the movable rails 12R, 12L with respect to a corresponding one of the fixed rails 11R, 11L.

As indicated by chain lines in FIG. 2, after the driving forces that are output from the electric motors 14AR, 14AL are transmitted toward the corresponding movable rails 12R, 12L, their transmission directions are turned by 90 degrees, and then the driving forces are input to the corresponding drive units 15.

Specifically, after the driving forces that are output from the electric motors 14AR, 14AL are transmitted in horizontal directions (hereinafter referred to as "left-right directions") orthogonal to longitudinal directions of the movable rails 12R, 12L (hereinafter, referred to as "front-rear directions"), their transmission directions are turned vertically downward, and then the driving forces are input to the corresponding drive units 15.

Figure 3:
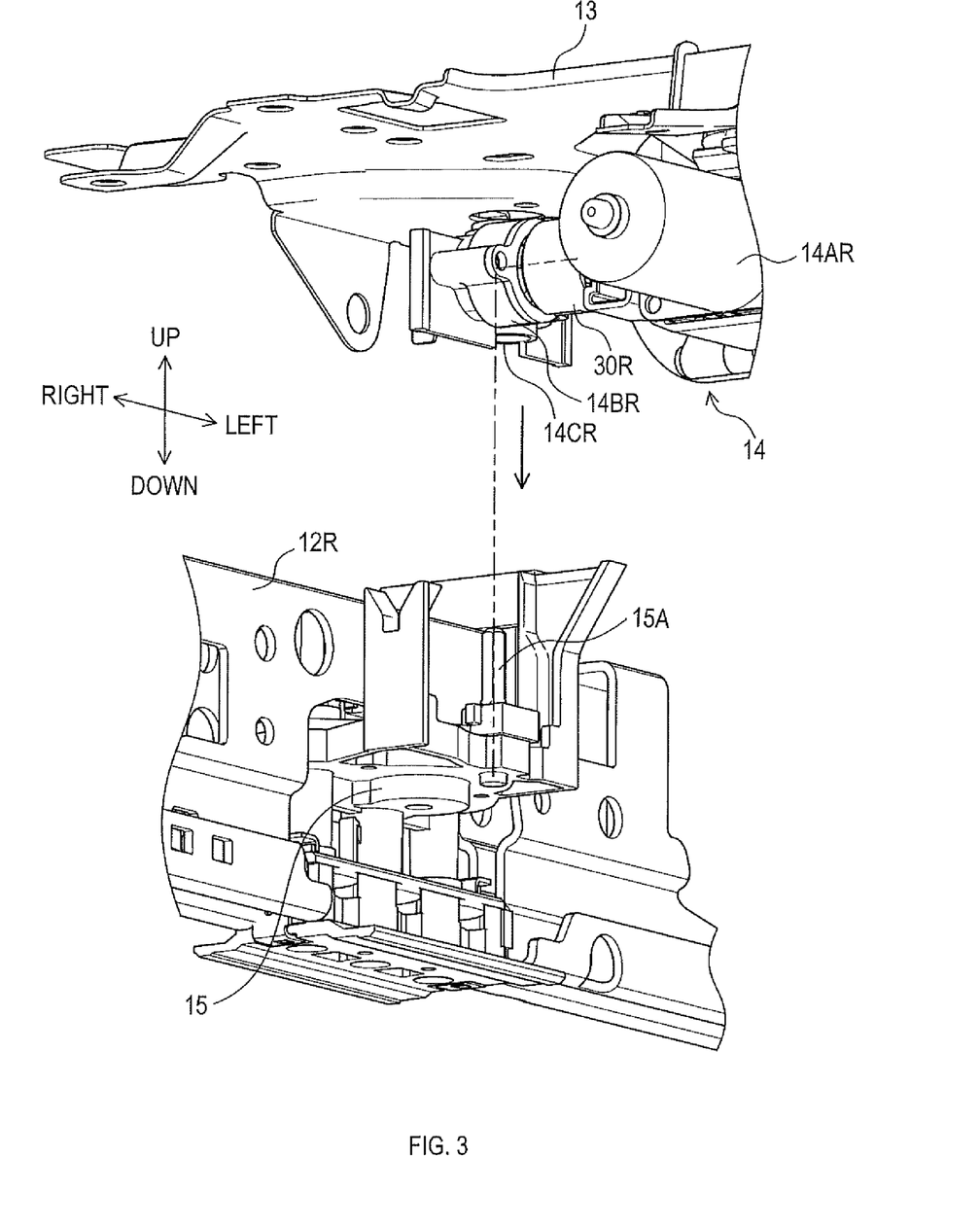
FIG. 3 is a view showing a driving force transmitter of the present embodiment.

Thus, as shown in FIG. 3, turning mechanisms 14BR, 14BL (only the turning mechanism 14BR is shown in FIG. 3) are provided on a movable rail 12R-side and a movable rail 12L-side of the regulator bracket 13 (only the movable rail 12R is shown in FIG. 3). The turning mechanisms 14BR, 14BL are mechanisms to turn the transmission directions of the driving forces that are output from the respective electric motors 14AR, 14AL by 90 degrees.

The turning mechanisms 14BR, 14BL respectively comprise sockets 14CR, 14CL (only the socket 14CR is shown in FIG. 3) in each of which a drive shaft 15A is fitted. The drive shaft 15A is a shaft which is provided in the drive unit 15 and to which the driving force is input.

The sockets 14CR, 14CL fit with the corresponding drive shafts 15A, and transmit the driving forces of the electric motors 14AR, 14AL to the corresponding drive shafts 15A.

The drive shafts 15A corresponding to the turning mechanisms 14BR, 14BL function as driving force transmitters to transmit the driving forces generated in the electric motors 14AR, 14AL to the respective drive units 15.

The motor unit 14 is coupled to the turning mechanisms 14BR, 14BL through respective rotational force transmission devices 30R, 30L. Rotational forces output from the electric motor 14AR, 14AL are transmitted to the corresponding turning mechanisms 14BR, 14BL though the respective rotational force transmission devices 30R, 30L.

2.2 Configuration of Rotational Force Transmission Device

The two rotational force transmission devices 30R, 30L shown in FIG. 2 have substantially symmetrical configurations with respect to a seat-width direction center line. Hereinafter, a description will be given of a configuration of the rotational force transmission device 30L located on one end side in the seat-width direction. The rotational force transmission device 30R also has the same configuration, so that no description thereof will be given here.

Figure 4:
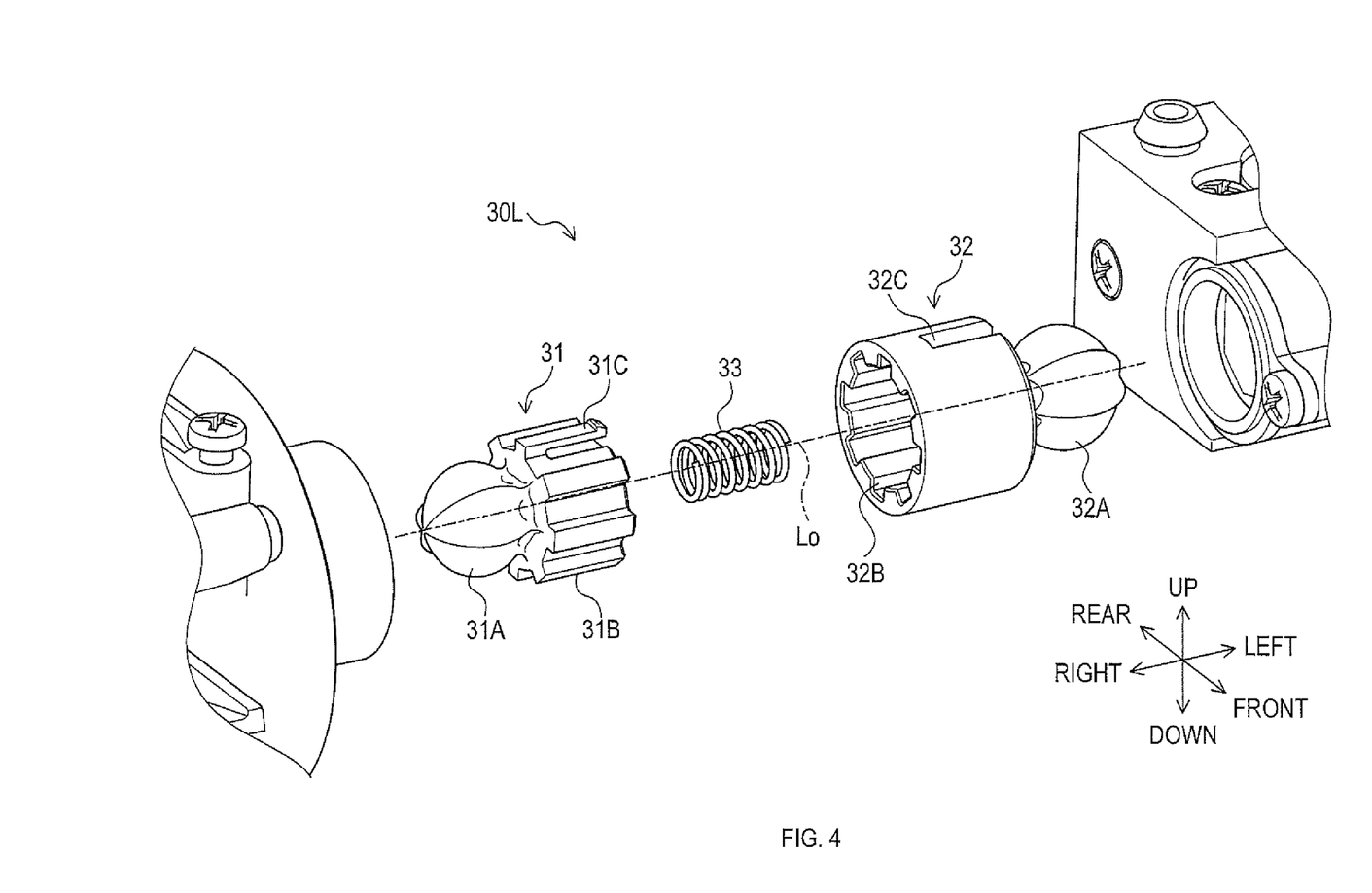
FIG. 4 is an exploded view of the rotational force transmission device.

As shown in FIG. 4, the rotational force transmission device 30L comprises an input-side transmission member 31, an output-side transmission member 32, and an elastic member 33. The input-side transmission member 31 is a rotation body comprising a ball point 31A to which a rotational force is input.

Figure 5:
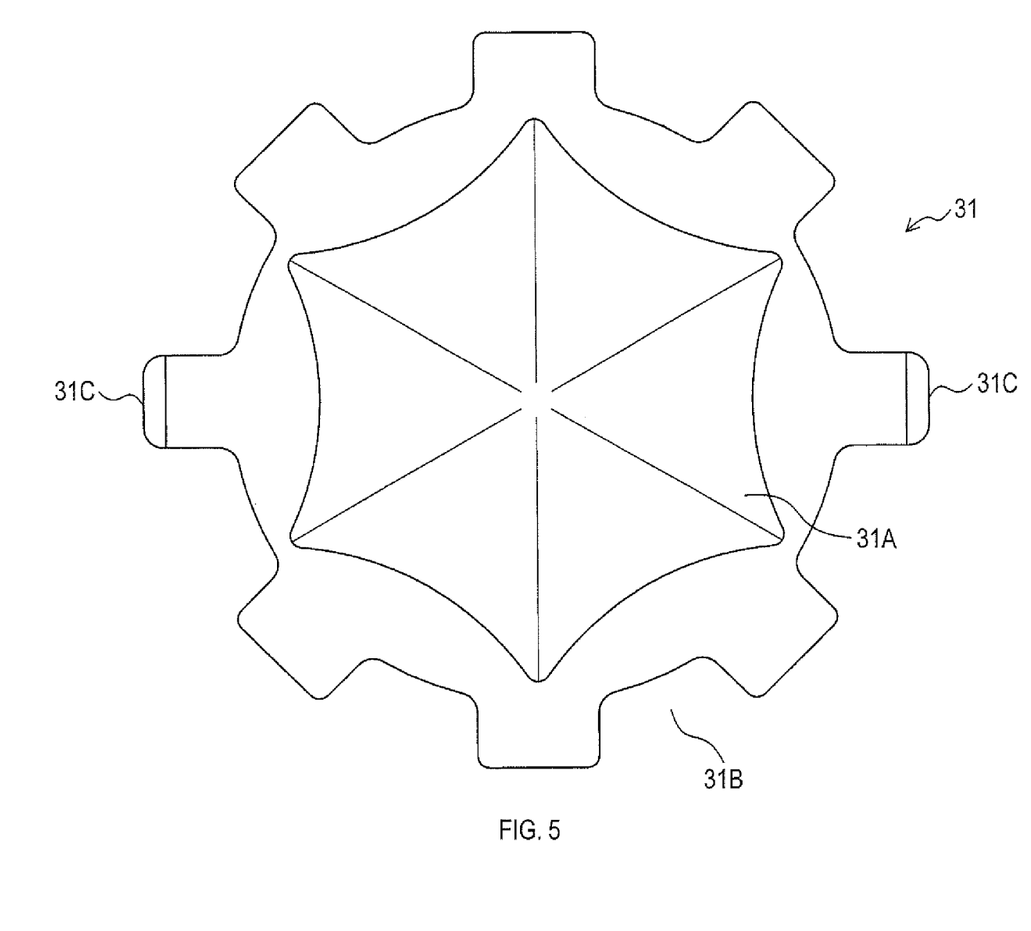
FIG. 5 is a view showing an input-side transmission member.
Figure 6:
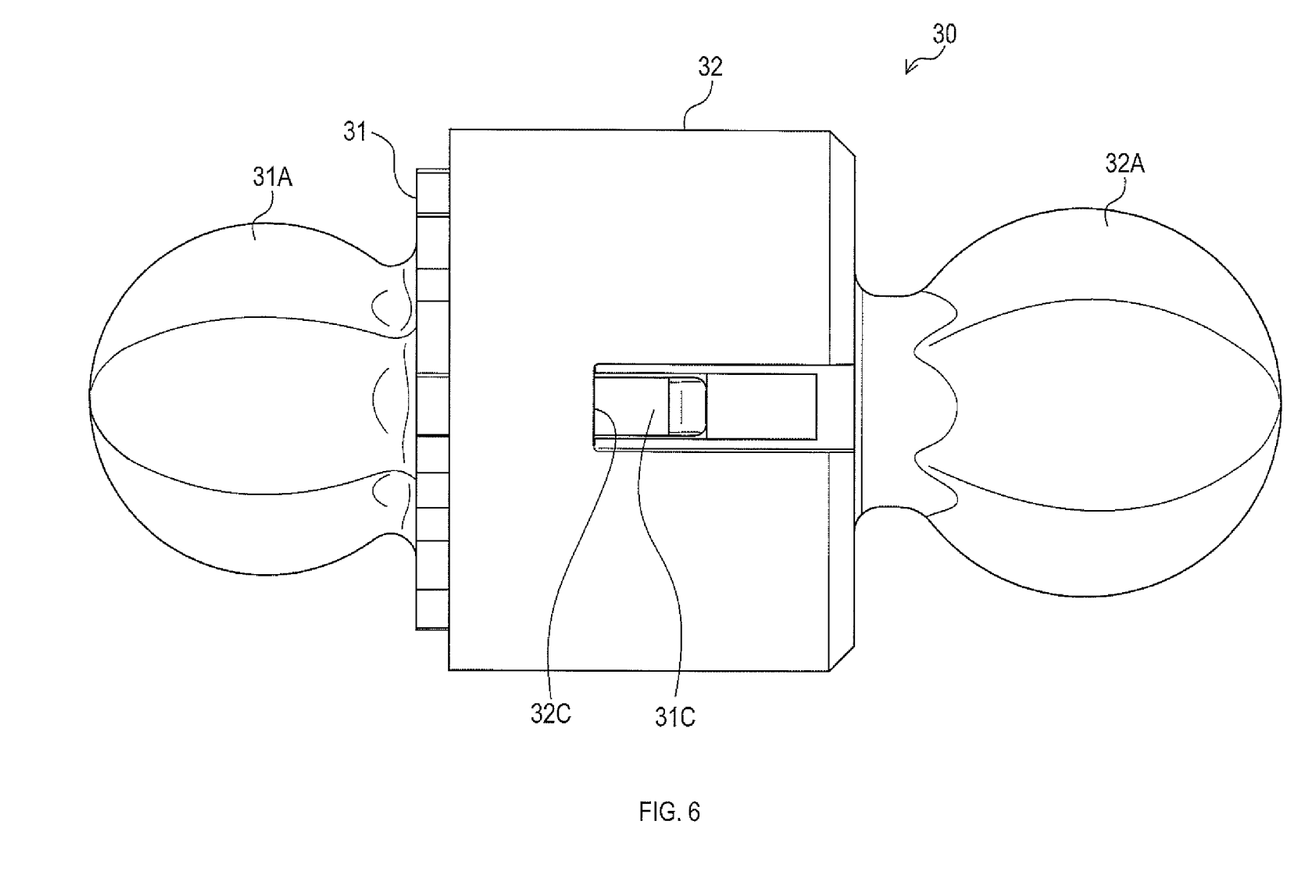
FIG. 6 is a view showing the rotational force transmission device.

The ball point 31A has a polygonal shape, such as a hexagonally conical shape, in a section orthogonal to a direction of a central axis La (see FIG. 5). Also, an outer shape of the ball point 31A that is projected on a virtual plane orthogonal to the section including the direction of the central axis La is circular or elliptical (see FIG. 6). Further, the motor unit 14 has a hexagonal hole (not shown) in which the ball point 31A is fit.

The output-side transmission member 32 is a rotation body comprising a ball point 32A configured to output a rotational force. The ball point 32A has a shape similar to or congruent with the ball point 31A. Further, the turning mechanism 14BR on one end side in the seat-width direction has a hexagonal hole (not shown) in which the ball point 32A is fit.

The input-side transmission member 31 and the output-side transmission member 32 are slidably coupled to each other along a central axis Lo direction of the ball point 31A. Specifically, the input-side transmission member 31 and the output-side transmission member 32 having respective splined portions 31B, 32B (see FIG. 4) are slidably coupled to each other.

The elastic member 33 provides an elastic force to make the input-side transmission member 31 and the output-side transmission member 32 displaced apart from each other along the central axis Lo direction. Thus, in the present embodiment, the input-side transmission member 31 comprises a locking portion 31C, and the output-side transmission member 32 comprises a locked portion 32C.

The locking portion 31C is locked to the locked portion 32C. The locking portion 31C has a locking structure, such as a snap fit, by means of elastic deformation. The elastic member 33 is configured with a coil spring made of metal.

The input-side transmission member 31 is an integrally formed member of resin including the ball point 31A, the splined portion 31B, and the locking portion 31C. Similarly, the output-side transmission member 32 is an integrally formed member of resin including the ball point 32A, the splined portion 32B, and the locked portion 32C.

3. Features of Sliding Device of the Present Embodiment

In the rotational force transmission devices 30R, 30L, dimensional variations in the axial direction are absorbed by the elastic member 33, and dimensional variations leading to crossing of the respective axial directions are absorbed by the ball point 31A or the ball point 32A.

The input-side transmission member 31 having the splined portion 31B and the output-side transmission member 32 having the splined portion 32B are slidably coupled to each other. Thus, in the rotational force transmission devices 30R, 30L, a rotational force is surely transmitted from the input-side transmission member 31 to the output-side transmission member 32 by means of the splined portions 31B, 32B.

In addition, the input-side transmission member 31 comprises the locking portion 31C locked to the locked portion 32C of the output-side transmission member 32. This reduces separation between the input-side transmission member 31 and the output-side transmission member 32 due to the elastic force of the elastic member 33. Thus, an improved assemblability of the rotational force transmission device 30 can be achieved.

Other Embodiments

The elastic member 33 of the above-described embodiment is configured with a metal coil spring. However, the present disclosure is not limited to such configuration. Specifically, the elastic member 33 may be configured, for example, with an elastic body, such as rubber.

In the above-described embodiment, the input-side transmission member 31 comprises the locking portion 31C, and the output-side transmission member 32 comprises the locked portion 32C. However, the present disclosure is not limited to such configuration.

Specifically, the present disclosure may be configured, for example, such that the output-side transmission member 32 comprises the locking portion 31C, and the input-side transmission member 31 comprises the locked portion 32C, or such that the locking portion 31C and the locked portion 32C are omitted.

In the above-described embodiment, the input-side transmission member 31 and the output-side transmission member 32 are coupled to each other through the splined portions 31B, 32B. However, the present disclosure is not limited to such configuration.

Specifically, the disclosure may be sufficed by an engagement structure that allows transmission of the rotational force from the input-side transmission member 31 to the output-side transmission member 32. Accordingly, the input-side transmission member 31 and the output-side transmission member 32 may be coupled to each other, for example, with a gear shaped protrusion.

The motor unit 14 of the above-described embodiment comprises two electric motors 14A. However, the present disclosure is not limited to such configuration. Specifically, the motor unit 14 of the present disclosure may be configured with, for example, a single electric motor.

In the above-described embodiment, the input-side transmission member 31 is configured to be fit in a fitting hole of the output-side transmission member 32. However, the present disclosure is not limited to such configuration. Specifically, the present disclosure may include, for example, a configuration in which the output-side transmission member 32 is fit in a fitting hole of the input-side transmission member 31.

The above-described embodiment shows an example of applying the rotational force transmission device 30 of the present disclosure to the sliding device 10. However, the present disclosure is not limited to this example. Specifically, the present disclosure may be applicable to movable devices other than the sliding device 10.

The ball points 31A, 32A of the above-described embodiment each have a shape corresponding to a hexagonal wrench. However, the present disclosure is not limited to this shape. The ball points 31A, 32A of the present disclosure each may have, for example, a shape of hexalobular internal in accordance with ISO 10664 ("Hexalobular internal driving feature for bolts and screws").

The above-described embodiment shows an example of a vehicle seat of a car. However, the present disclosure is not limited to this. The present disclosure may be also applied, for example, to seats for use in railroad vehicles and other vehicles, such as ships and aircrafts, and to stationary seats for use in theaters, households, and so on.

Further, the present disclosure is not limited to the above-described embodiment, but may include any embodiments consistent with the subject matter of the disclosure in the above-described embodiment. A configuration may be employed in which at least two embodiments among the above-described embodiments are combined, or in which some of the elements shown in the figures or elements illustrated with affixed numerals in the above-described embodiments are omitted.

What is claimed is:

1. A rotational force transmission device to transmit a rotational force for use in a vehicle seat apparatus, the rotational force transmission device comprising:
    an input-side transmission member that comprises a ball point to which a rotational force is input;
    an output-side transmission member slidably coupled to the input-side transmission member along a central axis direction of the ball point, the output-side transmission member comprising a ball point to output a rotational force,
    wherein the ball point to which the rotational force is input faces a first direction and the ball point to output the rotational force faces a second direction opposite to the first direction; and
    an elastic member providing a continually-applied elastic force to maintain the input-side transmission member and the output-side transmission member displaced apart from each other along the central axis direction.

2. The rotational force transmission device according to claim 1, wherein the input-side transmission member and the output-side transmission member comprise respective splined portions and are slidably coupled to each other.

3. The rotational force transmission device according to claim 1, wherein one of the input-side transmission member or the output-side transmission member comprises a locking portion that is locked to a locked portion provided to the other of the input-side transmission member or the output-side transmission member.

4. The rotational force transmission device according to claim 1, wherein the rotational force transmission device is configured for use in a vehicle seat apparatus.

5. The rotational force transmission device according to claim 1, wherein
    the input-side transmission member comprises a locking portion, and
    the output-side transmission member comprises a locked portion that is locked to the locking portion to lock the input-side transmission member and the output-side transmission member.

6. The rotational force transmission device according to claim 5, wherein the locking portion comprises a snap fit structure.

7. The rotational force transmission device according to claim 5, wherein
- the input-side transmission member and the locking portion are integrally formed as a single structure of resin, and/or
- the output-side transmission member and the locked portion are integrally formed as a single structure of resin.

8. The rotational force transmission device according to claim 1, wherein
- the ball point of the input-side transmission member has a polygonal shape in a section orthogonal to a direction of a central axis of the ball point, the polygonal shape including a hexagonally conical shape, and/or
- the ball point of the output-side transmission member has a polygonal shape in a section orthogonal to a direction of a central axis of the ball point of the output-side transmission member, the polygonal shape including a hexagonally conical shape.

9. The rotational force transmission device according to claim 1, wherein the elastic member is configured with a coil spring made of metal.

10. The rotational force transmission device according to claim 1, wherein both the input side transmission member and the output side transition member are hollow splined members such that the elastic member fits within both the input side transmission member and the output side transition member.

* * * * *